United States Patent [19]
Voelker

[11] 4,079,726
[45] Mar. 21, 1978

[54] SYSTEM FOR STORAGE AND USE OF SOLAR ENERGY

[76] Inventor: Percy Voelker, 455 Grant Ave., Brooklyn, N.Y. 11208

[21] Appl. No.: 679,758

[22] Filed: Apr. 23, 1976

[51] Int. Cl.² ............................................. F24J 3/02
[52] U.S. Cl. .................................. 126/271; 4/172.12; 4/172.14
[58] Field of Search ............... 126/270, 271; 237/1 A; 4/172, 172.15, 172.21, 172.13, 172.14

[56] References Cited

U.S. PATENT DOCUMENTS

| 2,996,729 | 8/1961 | Bailey | 4/172.15 |
| 3,022,781 | 2/1962 | Andrassy | 126/271 |
| 3,076,450 | 2/1963 | Gough et al. | 126/271 |
| 3,620,206 | 11/1971 | Harris et al. | 126/271 |
| 3,859,980 | 1/1975 | Crawford | 126/271 |
| 3,910,490 | 10/1975 | Saypalia, Jr. | 126/271 |
| 3,949,095 | 8/1976 | Pelehach et al. | 126/271 |
| 4,003,364 | 1/1977 | Balkus, Jr. | 126/271 |

FOREIGN PATENT DOCUMENTS

| 2,442,529 | 3/1976 | Germany | 126/271 |
| 1,328,372 | 8/1973 | United Kingdom | 126/271 |

Primary Examiner—Kenneth W. Sprague
Assistant Examiner—James C. Yeung
Attorney, Agent, or Firm—Arthur T. Fattibene

[57] ABSTRACT

A system for economically storing solar energy in the form of heated water. The system includes an above ground swimming pool in conjunction with a solar collector whereby the water of the pool is heated and stored therein until needed for use. In one form of the invention, the solar collector comprises a solar cover overlying or floating on the water in the pool. The cover is provided with an inlet and outlet through which the pool water is circulated and heated by the solar energy penetrating the cover. In another form the solar collector comprises a remotely disposed collector comprising a covered box having therein a plurality of channels connected in liquid flow with the pool water.

5 Claims, 13 Drawing Figures

U.S. Patent   March 21, 1978   Sheet 4 of 4   4,079,726

SYSTEM FOR STORAGE AND USE OF SOLAR ENERGY

PROBLEM AND PRIOR ART

Because of the current energy crises, efforts to harness solar energy are becoming more numerous, particularly in the uses thereof for home heating. A means for harnessing solar energy for home heating has been the use of solar converters in which a liquid or water is heated by solar radiation, and the liquid or water so heated stored until readied for use. Since the temperature to which such water can be heated is not very high, e.g., in the order of 120° to 140° F, relatively large quantities of such heated water is needed to heat a home on non-solar days. For example, in the case of a small home, a water storage capacity of 5000 gallons is required to store 300,000 BTU's. This is predicated on the ability to heat water up to 140° F and to use it for giving a heat comfort range of 75° to 80° F.

To store such large quantities of heated water, it was customary to construct a below ground reservoir. However, such inground reservoir required large initial expenditures and/or was impractical in certain areas, e.g., in rocky or bed rock areas. At best such applications were limited and costly.

OBJECTS

An object of this invention is to provide an above ground reservoir for the storage of solar energy in the form of heated water which is relatively simple and inexpensive.

Another object is to convert a conventional above ground, backyard pool into an insulated reservoir for storing solar energy in the form of heated water.

Another object is to provide a backyard pool which can be used for recreational uses during the summer season and which can be readily converted into a storage reservoir of solar heated water.

Another object is to provide an improved solar convertor which is relatively inexpensive and positive in operation.

Another object is to provide a solar convertor which is in the form of a protective cover for a swimming pool.

Another object is to provide a pool cover which is constructed to function as a solar covertor for heating the pool water.

Another object is to provide an improved solar collector remotely disposed form the storage pool.

BRIEF SUMMARY OF THE INVENTION

The foregoing objects and other features and advantages are attained by insulating a conventional above ground pool with thermal insulating material whereby the pool may be used for recreation in the summer season and as a hot water storage reservoir for winter heating. The water of the pool can be heated for swimming and/or for winter heating by solar energy. A solar convertor for heating the pool for swimming comprises a pool cover adapted to extend across the top of the pool and it is constructed so as to permit the flow therethrough of the pool water to be heated by solar radiation.

This invention further includes a improved solar convertor which can be remotely disposed from the pool to effect the heating thereof by solar radiation.

When used as a reservoir for storing solar energy in the form of hot water for heating, a heat exchanger is disposed in heat transfer relationship with the liquid heating medium of the solar convertor and the pool water. A second heater exchanger is provided for effecting the heat exchange between the heated pool water and the heating medium utilized for heating; e.g., a radiator or other heating appliance or use.

FEATURES

A feature of this invention resides in the provision wherein an above ground backyard pool can be readily converted into a storage facility of solar heated water which can be used for heating purposes.

Another feature resides in the provision of a readily inexpensive pool cover which can also function as a solar convertor for heating the pool water for swimming.

Another feature resides in the provision of an improved solar convertor arranged to be remotely disposed relative to the storage pool and which comprises a solar absorber formed of readily flexible sheets which define a series of channels through which a heating medium is circulated and which is relatively inexpensive and positive in operation.

Other features and advantages will become more readily apparent when considered in view of the drawings and specification in which.

DETAILED DESCRIPTION

Figure 2:
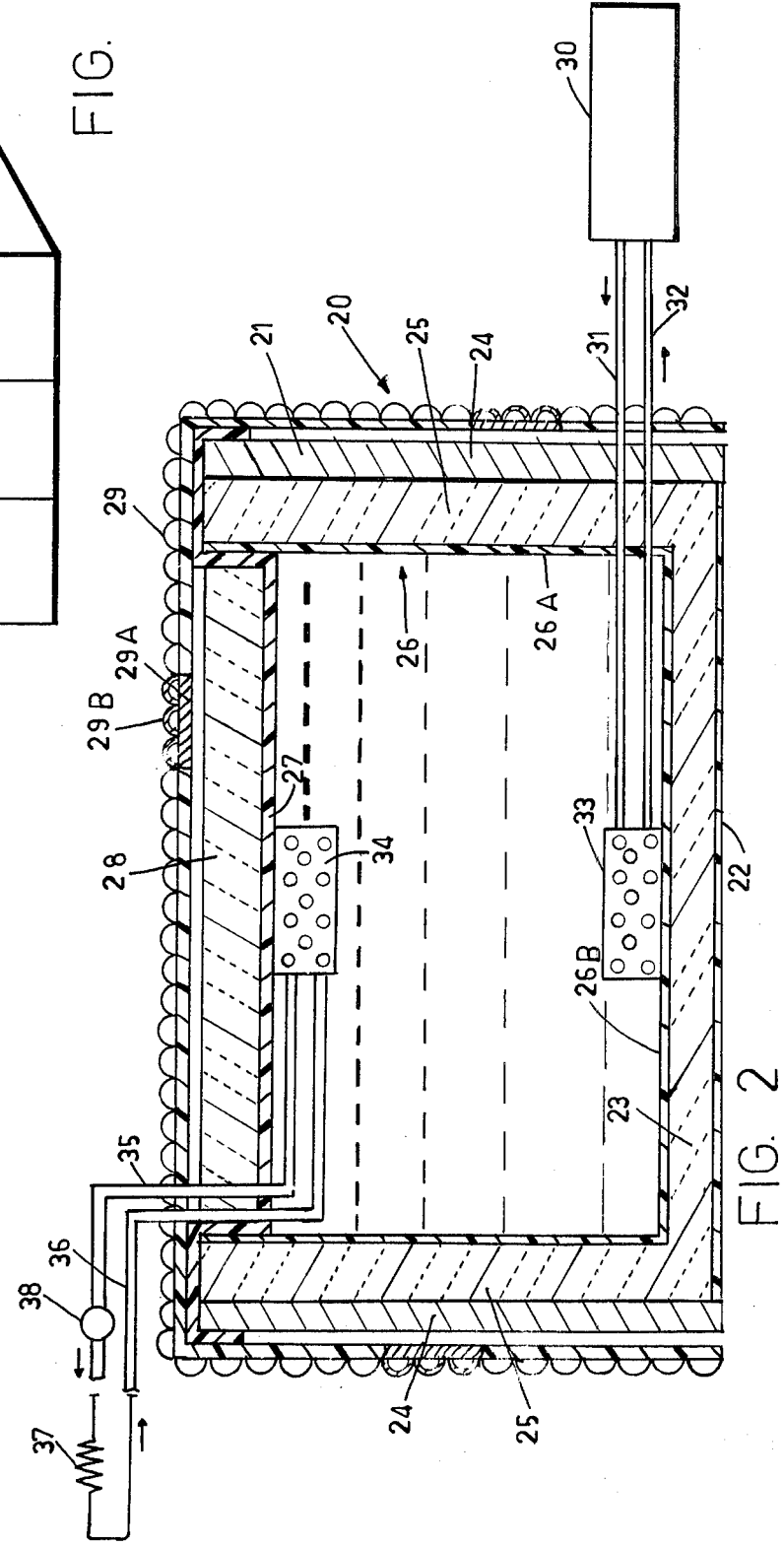
FIG. 2 is a sectional side view of the pool of FIG. 1 arranged for storage of solar energy in the form of heated water.

Referring to the drawings, there is shown in FIG. 2 a system 20 whereby solar energy can be economically stored in the form of heated water. The storage means comprises a open top vessel 21, e.g., in the form of an above ground swimming pool whereby the pool can be readily used for swimming during the summer months and used as a source of solar heated hot water in the colder months.

Figure 1:
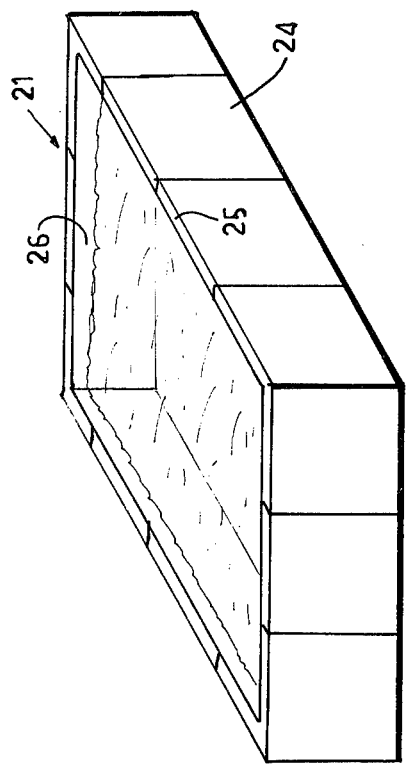
FIG. 1 is a perspective view of a swimming pool embodying the present invention with the cover or top insulation removed.

Referring to FIG. 2, the ground beneath the pool or vessel 21 is impermeabilized, e.g., by a sheet of imperforate material such as a plastic sheet 22. Over the sheet 22 there is disposed a layer of suitable insulating material 23. The insulating material 23 may comprise mineral wool, fiber glass or any of the plastic insulating materials. About the insulated bottom layer 23, there is disposed the pool circumscribing side walls 24. Such side walls 24 may comprise a metal girdle or any other suitable construction for withstanding the weight and/or pressure of the water to be contained within the pool. In FIG. 1, it will be noted that a rectangular pool is disclosed. However, the pool may take any desired shape including a round pool. As shown in FIG. 2, the inner surface of the pool side walls 24 is lined with a layer of insulating material 25. Such insulated layer may comprise continguous sheets or sections of foam plastic or other suitable insulating material. A pool liner 26 is disposed adjacent the insulated walls for containing the water. The liner 26 includes a circumscribing side wall 26A and a connected bottom wall 26B to define a fluid tight liner.

As shown in FIG. 1, a pool so constructed can be readily used for its intended purposes during the summer months of the year. To convert such a pool 21 for operation as a storage means for solar energy in the form of hot water, top or cover 27 is placed over the open top of the pool 21. As shown in FIG. 2, the top 27 covers the surface of the water and drapes slightly over the top edges of the pool. Above the cover 27, slabs of thermal insulating material 28 are placed. In this manner the exposed surface of the water is insulated to prohibit heat loss.

Above the top insulated surface 28 there is provided a covering shield 29. The covering shield is sufficiently large so that it extends over the top of insulation 28 and drapes around the sides 24 of the pool. As best seen in FIG. 1, the shield 29 is formed of connected sheets of plastic material 29A, 29B in which the upper layer 29B is formed to define a series of bubbles or blister like forms so that air is entrapped between layers 29A and 29B. Thus the blister or bubbled shield 29 adds additional thermal insulating characteristics to the pool.

The water of the pool is heated by solar energy. This is attained by means of a solar absorber 30 which, as seen in FIG. 2, is remotely disposed from the pool or water storage 21. The solar absorber 30 is connected by means of conduits 31 and 32 for circulating a heating medium between the solar absorber and a heat exchanger 33 located adjacent the bottom of the pool. It will be understood that any of the known solar heating panels may be utilized in a solar absorber wherein the heat radiated by solar energy is utilized to heat up a fluid medium. The heating medium may comprise the pool water which is circulated through the solar absorber 30 for direct heating of the pool water by solar energy or the heating medium may comprise any suitable liquid heat transfer medium, anti-freeze and the like. for indirectly heating the pool water.

In the case of indirect heating, the heat exchanger 33 defines a closed system with the solar absorber 30. Thus, in this manner, the solar energy striking the absorber 30 can be readily stored as hot water in the insulated pool 21 where heat loss is reduced to a minimum.

In order to extract the heat from the stored hot water, a second heat exchanger 34 is located adjacent the top of the pool. The heat extracting, heat exchanger 34 is connected by conduits 35, 36 to a suitable radiator, boiler or like device 37. Heat exchanger 34 may be of the type in direct heat transfer relationship with the pool water, or in indirect heat transfer relationship. That is, in direct heat transfer relation to the heated pool water is circulated to the appliance or radiator 37. In indirect heat transfer relationship, a closed heating medium is contained between the heat exchanger 34 and the radiator or device 37 which heating medium is heated by indirect contact with the heated water of the pool. A regulating valve 38 may be provided in conduit 36 to control the circulating of the heating medium as required.

Figure 9:
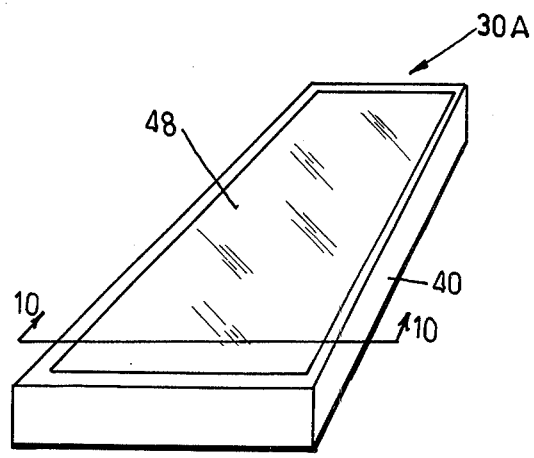
FIG. 9 is a perspective view of a solar convertor adapted for use with the pool construction of FIG. 1.
Figure 10:
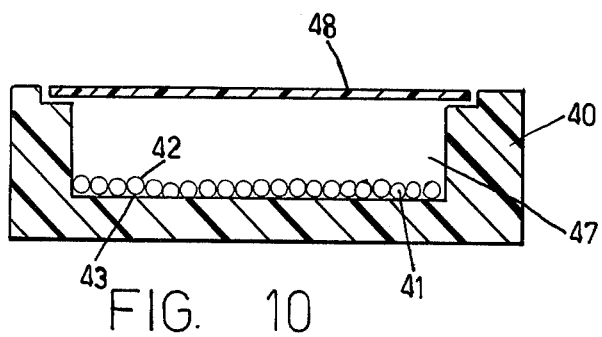
FIG. 10 is a sectional view taken along line 10—10 on FIG. 9.
Figure 12:
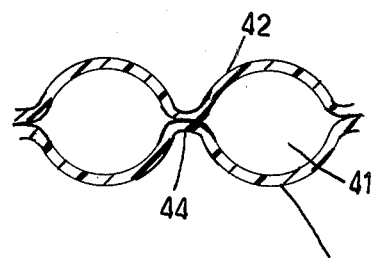
FIG. 12 is a detail sectional view of the solar absorber of FIG. 9.

FIGS. 9 and 12 illustrate a form of solar absorber 30A adapted for use in the system 20 described.

As shown the solar absorber of FIG. 9 comprises a box like structure 40 formed of heat insulating material, e.g., cellular foam or plastic. Disposed on the bottom of the box 40 is a means for defining a series of channels 41 through which a heating medium flows. In the illustrated embodiment the means defining the channels 41 comprises an upper and lower sheet of plastic film 42, 43 which are suitably fused or heat sealed along seams 44, to define a serpentine series of channels 41. The upper sheet or film 42 is formed of a clear or transparent material. The lower sheet 43 is rendered heat absorptive. The respective channels 41 defined between sheets 42 and 43 connected with an inlet and outlet 45, 46 respectively which in turned are connected to conduits 32 and 31 respectively. Spaced above the channels 41 and closing the top of the box is a window or glass pane 48.

Figure 11:
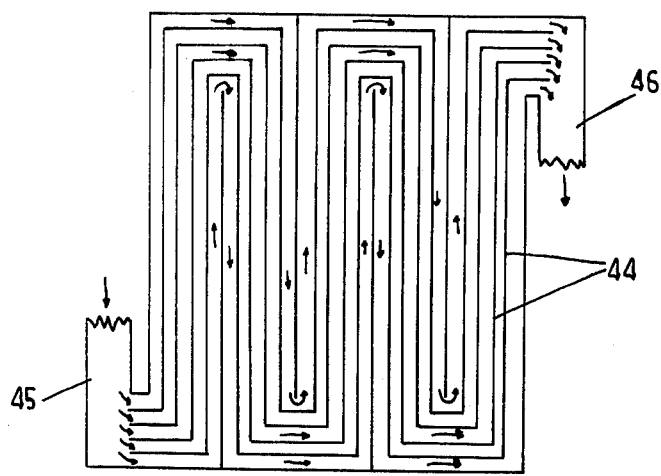
FIG. 11 is a detail plan view of the solar absorber component of FIG. 9.

As best seen in FIG. 11, the sheets 42 and 43 are fused or seamed for delineating a series of serpentine channels 41, disposed in side-by-side relationship and which channels 41 are separate and independent; and which extend between the inlet manifold 45 and outlet manifold 46. In this manner the maximum area of the sheets 42, 43 are utilized. It will be understood that the array of channels 41 can vary; and can be formed in a variety of forms. It will also be noted that the sides of the box 49 are sufficiently high so as to create an air space 47 between the channels 41 and the top or glass plate 48.

In operation the transparency of the top plate 48 and the top sheet 42 defining channels 41 transmit light or solar radiation therethrough so that the solar penetrating therethrough is transformed into heat by the solar absorptive black layer or sheet 43. The heat in turn is thus utilized to heat up the fluid medium circulating through channels 41.

Figure 3:
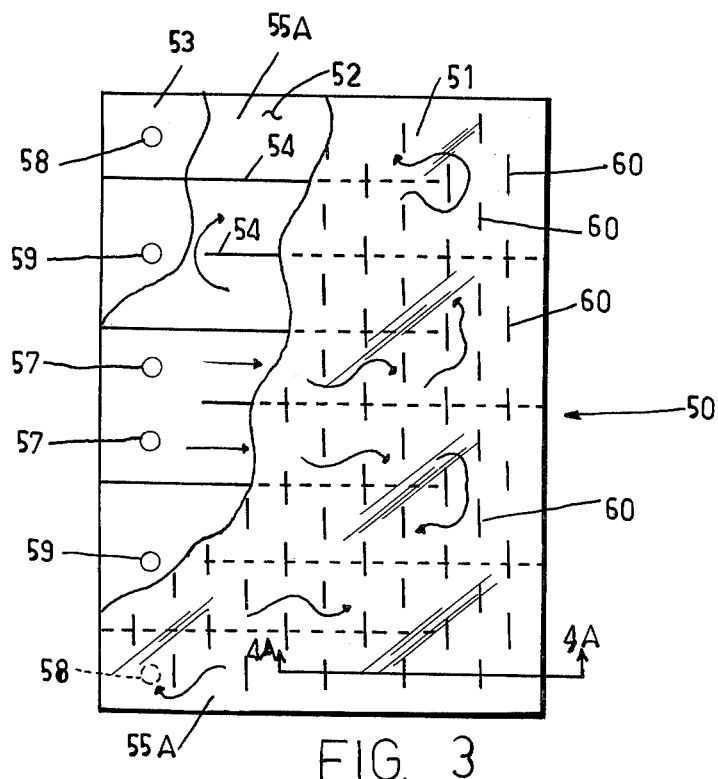
FIG. 3 is a plan view of a pool cover - solar convertor for use with the pool of FIG. 1; and having parts broken away.
Figure 4:
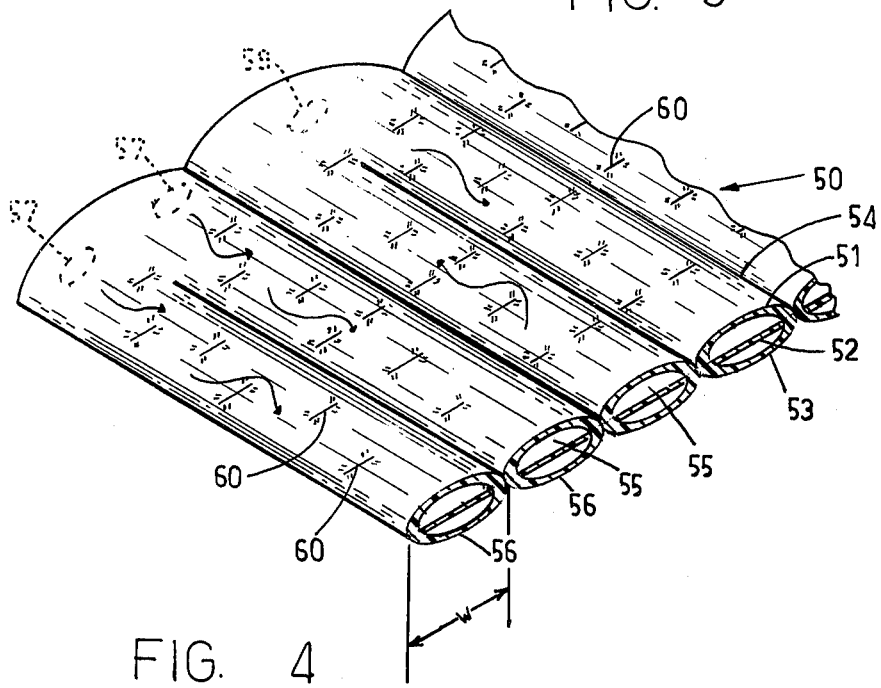
FIG. 4 is a detailed fragmentary portion in section of the pool cover of FIG. 3.
Figure 4A:
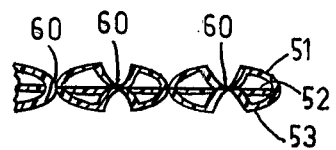
FIG. 4A is a section view taken along line 4A—4A of FIG. 4.

FIG. 3, 4 and 4A illustrate a modified solar absorber which may be particularly adapted to heat the water within pool 21 and at the same time function as a cover for such pool. The solar heated cover 50 of FIG. 3 is adapted to float upon the surface of the water of the pool, when exposed as in FIG. 1. The pool cover of FIGS. 3 and 4 is sized and shaped to conform to the exposed top of pool 21. As shown, the solar heated cover 50 is formed of at least three sheets of heat fusable plastic sheets 51, 52 and 53. The three sheets 51, 52, and 53 are superimposed and then heat sealed together to define a series of transverse seams 54. As best seen in FIG. 3, the seams 54 extend inwardly from opposed sides of the respective sheets 51, 52, and 53 in an alternating manner so that a continuous serpentine channel 55 is defined. According to this invention, the top sheet 51 is formed of a clear or transparent plastic to permit solar radiation to penetrate therethrough. The intermediate sheet 52 is formed of a heat absorptive or black plastic. The bottom most sheet 53 may be formed of any colored plastic sheet.

The channel 55 defined between the upper sheet 51 and intermediate sheet 53 are arranged to receive a circulating heating medium, e.g., the pool water.

The channels 56 defined between the intermediate sheet 52 and the bottom sheet 53 are rendered impervious to air so that they can be readily inflated, and thus render the cover 50 boyant where it can readily float upon the water surface of the pool 21.

In the embodiment of FIG. 3, the solar cover is provided with one or more openings 57 which define a water inlet whereby the pool water can be introduced into channels 55 for circulation therethrough.

The outer most channels 55A are formed with outlet openings 58 whereby the water flowing through channels 55 can be discharged into the pool as heated water. The intermediate channels may be provided with drain openings 59 which are normally plugged when the cover is in use as a solar absorber. As will be hereinafter described, the drain openings are provided to facilitate the draining of the intermediate channels of water when the cover is to be stored. It is also noted that the inlets 57, outlets 58 and drains 59 extend through the intermediate and bottom sheets only, and are formed so as to be fluid tight with respect to channels 55 and 56. Thus the water flowing through channels 55 cannot enter the air channels defined between the intermediate and bottom sheets 52 and 53. It will be understood that the channels 56 which are to be inflated with air will have suitable air inlets and exhausts (not shown) to facilitate the inflation thereof with air.

It will be noted that the openings 57, 58 and 59 are arranged along a common edge. In this manner the water within channels 55 can be readily evacuated, as when storing the cover 50, by simply rolling the cover onto itself toward the openings 57, 58 and 59. Accordingly the air inlet and outlets for the bottom channels 56 may be similarly located.

As shown in FIGS. 3, 4 and 4A the cover 50 is also provided with a series of relatively short bar seams or tacks 60 which extend transversely to the flow path of the water flowing through channels 55. As best seen in FIG. 4A, the tacks or bar seams constitute fused portions of the respective sheets 51, 52 and 53. Also, the length of a given bar seam 60 is less than the width W of the channel 55. As such, the bar seam does not seal off any given channel. Instead, the bar seams 60 in effect define a series of baffles which function to impede the flow of water therethrough as indicated by the arrow. Thus the bar seams or tacks 60 not only enhances the overall strength of the pool cover 50, but also creates a turbulence in the water flow therethrough to insure better water distribution and heat transfer. Also to prevent busting the output, drains 58 should be permanently opened.

In operation as a solar absorber, the pool cover 50 can be inflated and floated on the surface of the pool with the transparent side 51 facing the sun. Water of the pool is then pumped through the inlets 57 for circulation through channels 55 where the flow of water is heated by solar radiation and thereafter discharged into the pool as heated water. When the pool 21 is desired to be used for swimming, the solar cover can be readily removed. Even when removed the solar cover can still function by placing it on the ground along side the pool where the pool water can be continuously circulated through the cover even as the pool is being used for swimming. Since pools are normally provided with pumping equipment, the inlet and outlet 57 and 58 of the solar cover can be readily connected to suitable piping which effects water circulation therethrough. For storage, the pool cover can be readily rolled up. With the drain plugs for drains 59 removed, the water in channels 55 can be readily evacuated during the folding up of the pool cover.

Figure 5:
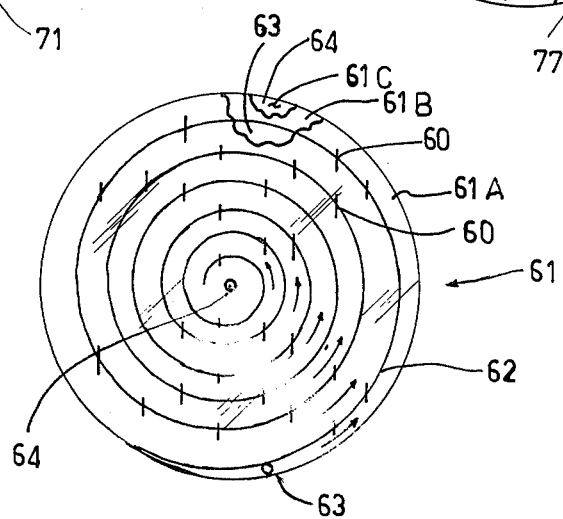
FIG. 5 is a plan view of a modified constuction of a pool cover embodying the present invention.

FIG. 5 illustrates a modified solar pool cover 61. As shown solar cover 61 is constructed for a circular pool. Essentially, cover 61 is formed of essentially three superimposed sheets 61A, 61B and 61C which are fused or sealed along a continuous spiral seam 62 to define upper and lower spiral channels 63 and 64. As hereinbefore described, the upper sheet 61A is transparent for transmitting solar energy therethrough with the middle sheet being heat absorbant. An inlet and outlet 63 and 64 is provided for circulating water in the upper spiral channel 63. In all other respects the cover 61 is similar to that hereinbefore described with respect to FIGS. 3, 4, and 4A. The cover 61 may also have fused bar seams 60 extending transversely of the spiral channel 63.

Figure 6:
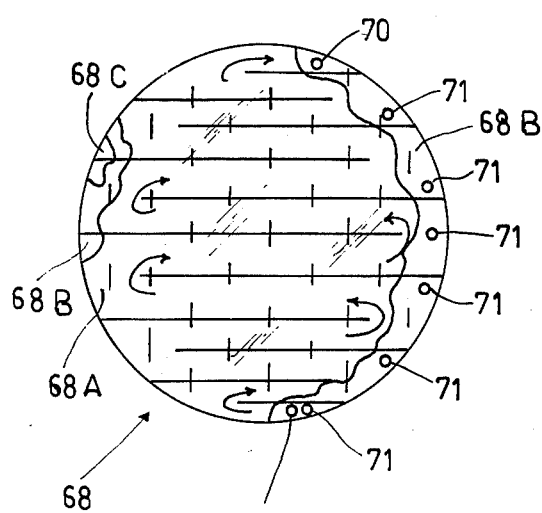
FIG. 6 is a plan view of another modified pool cover.

FIG. 6 illustrates another modified solar cover 68. As shown, cover 68 is circular shaped for use with a circular pool. It is formed by superimposed plastic sheets 68A, 68B and 68C similar to that of FIG. 5. However, the sheets 68A, 68B and 68C are fused along seams which extend inwardly from opposite sides in an alternating manner to define a continuous flow path from the inlet 69 to outlet 70. Along one side of the cover 68, the various segments of the flow path is provided with drains 71, which are normally closed by suitable plugs when the cover 68 is operating as a solar absorber. The plugs (not shown) for drains 71 are removed when the cover 68 is rolled for storage, thereby facilitating the evacuation of water therefrom. In all other respects, the structure, function and operation of the solar cover is similar to that hereinbefore described with respect to FIGS. 3, 4 and 4A.

Figure 7:
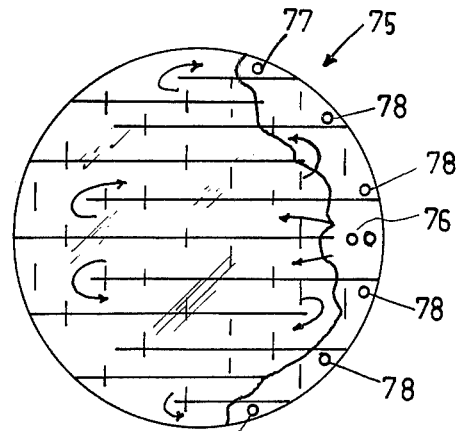
FIG. 7 is a plan view of another modified cover.

FIG. 7 is a modified cover 75 similar to that of FIG. 6 with the exception that the inlet 76 is centrally located so that the flow of water therethrough is divided into a plurality of serpentive flow paths as indicated by the flow arrows. Accordingly, an open drain 77 is provided at the each of each flow path. Plugged drains 78 are provided intermediate the flow paths along a common edge for the reasons hereinbefore described. In all other respects the solar cover 75 is similar to that of FIG. 6.

Figure 8:
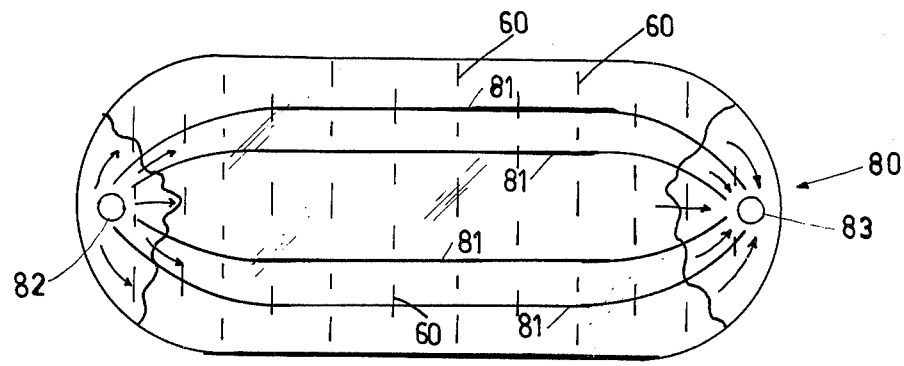
FIG. 8 is a plan view of another modified cover.

FIG. 8 illustrates an oval shaped solar cover 80. Like the other described covers, cover 80 is formed of three plastic sheets fused together along seams 81 to define a series of parallel flow paths between an inlet 82 and an outlet 83. If desired, transverse bar seams similar to bar seams or tacks 60 may be provided to cover 80 for the reasons hereinbefore described. In all other respects, the structure, function and and operation is similar to that described with respect to the solar cover of FIGS. 3, 4 and 4A.

From the foregoing, it will be noted that the present invention enables above ground backyard pools to function as a storage means for solar energy during the colder months, and further provides a solar cover whereby the pool can be solar heated for its intended purpose of heating.

While the present invention has been described with respect to several embodiments, it will be understood and appreciated that variations and modifications can be made without departing from the spirit or scope of the invention.

What is claimed is:

1. A swimming pool cover for heating the water in a swimming pool by solar energy comprising:

at least three superposed sheets of material, said superposed sheets including top sheet, an intermediate sheet and a lower most bottom sheet, means interconnecting said sheets to define a continuous flow channel between at least said top sheet and intermediate sheet, said flow channel having an inlet and outlet adapted to be connected to the water of the pool whereby said water is circulated therethrough, said top sheet being transparent, and said intermediate sheet having its surface opposite said transparent top sheet rendered heat absorptive, said means connecting said intermediate sheet and bottom sheet to define a closed air space therebetween whereby said air space provides bouyancy for said cover whereby said flow channel is maintained spaced from the surface of the pool water by the air space disposed between said intermediate and bottom sheets, and a plurality deflecting means extending transversely of the continuous flow channel for impeding the flow of water therethrough to enhance water distribution and heat transfer.

2. A swimming pool cover as defined in claim 1 wherein each of said three sheets are formed of a flexible fusable plastic material, and said means interconnecting said sheets comprises a fused seam interconnecting each of the respective sheets to define a continuous flow channel for said water between the top sheet and intermediate sheet, and a continuous air channel between said bottom sheet and intermediate sheet, and said air channel having an air inlet whereby said air channel can be inflated with air for rendering said cover bouyant.

3. A swimming pool cover as defined in claim 1 wherein deflecting means includes a plurality of fused bar seams extending transversely of said continuous flow channel, said bar seams having a length which is less than the width of said flow channel.

4. The invention as defined in claim 1 wherein said inlet and outlet are disposed along a common side of said cover.

5. A system for the storage and use of solar energy comprising:

an open top above ground swimming pool having a bottom wall and a circumscribing side wall adapted to contain a supply of water, means for thermally insulating the bottom wall and circumscribing side wall of said vessel, a cover extending across the the open top of said vessel, said cover including at least three superposed sheets of flexible plastic material, said superposed sheets including a top sheet, an intermediate sheet, and a lower most bottom sheet, means interconnecting said sheets to define a continuous flow channel between at least said top sheet and intermediate sheet, said flow channel having an inlet and outlet adapted to be connected to the water of the pool whereby said water is circulated therethrough, said top sheet being transparent and said intermediate sheet being heat absorptive, said means interconnecting said intermediate sheet and bottom sheet to define a closed air space therebetween, means defining an air inlet to said air space for inflating said air space to provide bouyancy for said cover whereby said flow channel is maintained above the surface of the pool water by the air space defined said intermediate and bottom sheets, a plurality of deflecting means extending transversely of said continuous flow channel for impeding the flow of water therethrough to enhance water distribution and heat transfer, said deflecting means including a plurality of fused bar seams extending transversely of said continuous flow channel, said bar seams having a length which is less than the width of said flow channel.

* * * * *